US011014478B2

(12) United States Patent
Benthaus et al.

(10) Patent No.: US 11,014,478 B2
(45) Date of Patent: *May 25, 2021

(54) SEAT SUPPORT LAYER ASSEMBLY

(71) Applicant: Lear Corporation, Southfield, MI (US)

(72) Inventors: Dirk Benthaus, Boeblingen (DE); Zvonko Van Der Meer, Sindelfingen (DE)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,766

(22) Filed: Apr. 5, 2019

(65) Prior Publication Data
US 2019/0232838 A1 Aug. 1, 2019

Related U.S. Application Data

(63) Continuation of application No. 15/404,604, filed on Jan. 12, 2017, now Pat. No. 10,293,725.

(30) Foreign Application Priority Data

May 27, 2016 (DE) .................... 10 2016 209 218.9
Jul. 7, 2016 (DE) .................... 10 2016 212 387.4

(51) Int. Cl.
B60N 2/66 (2006.01)
B60N 2/56 (2006.01)
(Continued)

(52) U.S. Cl.
CPC .............. *B60N 2/665* (2015.04); *A47C 7/467* (2013.01); *B60N 2/5642* (2013.01);
(Continued)

(58) Field of Classification Search
CPC ...................................................... B60N 2/665
(Continued)

(56) References Cited

U.S. PATENT DOCUMENTS 2,976,916 A * 3/1961 Schladermundt ...... A47C 7/185
297/452.21
3,642,323 A * 2/1972 Taylor .................... A47C 5/125
297/452.17
(Continued)

FOREIGN PATENT DOCUMENTS

CN 101124105 A 2/2008
CN 102602316 A 7/2012
(Continued)

OTHER PUBLICATIONS

Office Action of German Application No. DE 102016212387; dated May 15, 2017; 9 pages.‡

(Continued)

*Primary Examiner* — Robert Canfield
(74) *Attorney, Agent, or Firm* — Brooks Kushman P.C.

(57) ABSTRACT

A seat back assembly and method of manufacture is provided. The seat back includes a foam cushion layer. A support sub-assembly is formed including a rigid support layer with a plurality of cavities and channels defined on a rear surface for receiving components and a generally smooth front surface. At least one component is retained in one of the cavities and a second component is secured on the front surface of the support layer. A trim material covers the cushion layer and secures the sub-assembly to the seat back.

18 Claims, 4 Drawing Sheets

(51) Int. Cl.
*B60N 2/68* (2006.01)
*B60N 2/90* (2018.01)
*B60N 2/02* (2006.01)
*A47C 7/46* (2006.01)
*B60N 2/868* (2018.01)

(52) U.S. Cl.
CPC ......... *B60N 2/5657* (2013.01); *B60N 2/5678* (2013.01); *B60N 2/868* (2018.02); *B60N 2002/0264* (2013.01); *Y10S 297/01* (2013.01); *Y10S 297/03* (2013.01)

(58) Field of Classification Search
USPC ............. 297/284.6, 452.27, 452.41, 452.37, 297/452.38, 452.31, DIG. 1, DIG. 2, 297/DIG. 3
See application file for complete search history.

(56) References Cited

U.S. PATENT DOCUMENTS

| | | | | |
|---|---|---|---|---|
| 3,758,159 | A | * | 9/1973 | Morris .................... B60N 2/38 297/452.14 |
| 4,555,140 | A | * | 11/1985 | Nemoto ................... B60N 2/66 297/452.54 |
| 4,615,563 | A | ‡ | 10/1986 | Kobayashi ............. A47C 7/467 297/284.6 |
| 4,690,456 | A | * | 9/1987 | Chiba .................... A47C 7/467 297/284.6 |
| 5,105,491 | A | * | 4/1992 | Yoshiyuki ............... B60N 2/70 297/DIG. 1 |
| 5,529,377 | A | ‡ | 6/1996 | Miller ..................... A47C 4/54 297/28 |
| 5,772,281 | A | * | 6/1998 | Massara ................. B60N 2/643 297/284.4 |
| 5,797,155 | A | ‡ | 8/1998 | Maier ................... A61G 5/1043 297/284.6 |
| 5,975,629 | A | ‡ | 11/1999 | Lorbiecki .................. B62J 1/12 297/20 |
| 6,003,950 | A | ‡ | 12/1999 | Larsson ................... A47C 7/74 297/180.13 |
| 6,062,641 | A | * | 5/2000 | Suzuki .................... A47C 7/74 297/180.1 |
| 6,129,419 | A | * | 10/2000 | Neale ....................... B60N 2/58 297/284.4 |
| 6,629,725 | B1 | ‡ | 10/2003 | Kunkel .................. B60N 2/5635 297/180.12 |
| 7,837,271 | B2 | * | 11/2010 | Galbreath ................. B60N 2/72 297/452.48 |
| 8,162,398 | B2 | ‡ | 4/2012 | Colja .................... A61H 9/0078 297/28 |
| 8,215,714 | B2 | * | 7/2012 | Galbreath ................. B60N 2/70 297/452.27 |
| 8,282,164 | B2 | ‡ | 10/2012 | Galbreath ............... A47C 7/748 297/18 |
| 8,696,067 | B2 | ‡ | 4/2014 | Galbreath ............... B60N 2/012 297/452.1 |
| 8,857,908 | B2 | ‡ | 10/2014 | Brncick ................. B60N 2/0232 297/284.1 |
| 9,878,755 | B2 | * | 1/2018 | Rouland ................... B62J 1/26 |
| 2003/0075960 | A1 | ‡ | 4/2003 | Wilkerson ............. A47C 7/467 297/28 |
| 2003/0160479 | A1 | ‡ | 8/2003 | Minuth ................. B60N 2/5628 297/180.14 |
| 2003/0230913 | A1 | ‡ | 12/2003 | Buss ..................... B60N 2/5635 297/180.14 |
| 2005/0200166 | A1 | ‡ | 9/2005 | Noh ...................... B60N 2/5642 297/180.14 |
| 2006/0273650 | A1 | * | 12/2006 | Embach ................... B60N 2/70 297/452.27 |
| 2007/0158994 | A1 | ‡ | 7/2007 | Brennan .................. A47C 7/74 297/452.43 |
| 2007/0176471 | A1 | ‡ | 8/2007 | Knoll .................... B60N 2/5635 297/180.14 |
| 2009/0066122 | A1 | ‡ | 3/2009 | Minuth ................. B60N 2/5635 297/180.14 |
| 2009/0189424 | A1 | ‡ | 7/2009 | Chi ....................... A47C 3/0255 297/217.4 |
| 2010/0207443 | A1 | ‡ | 8/2010 | Brncick ................. B60N 2/686 297/452.48 |
| 2011/0018329 | A1 | * | 1/2011 | Galbreath ............... B60N 2/012 297/452.18 |
| 2014/0265491 | A1 | ‡ | 9/2014 | Galbreath ............... B60N 2/914 297/28 |
| 2015/0175042 | A1 | * | 6/2015 | Galbreath ................ B60N 2/64 297/452.48 |
| 2015/0274049 | A1 | ‡ | 10/2015 | Langensiepen ...... B60N 2/5628 297/180.12 |
| 2017/0248146 | A1 | * | 8/2017 | Wheeler ................. F04D 25/06 |
| 2017/0283070 | A1 | * | 10/2017 | Hall ...................... B60N 2/686 |

FOREIGN PATENT DOCUMENTS

| | | | | |
|---|---|---|---|---|
| CN | 203957939 U | ‡ | 11/2014 | |
| CN | 203957939 U | | 11/2014 | |
| CN | 105383343 A | | 3/2016 | |
| CN | 105584391 A | | 5/2016 | |
| DE | 3334864 A1 | * | 4/1985 | ............... A47C 7/02 |
| DE | 3334864 A1 | ‡ | 4/1985 | |
| DE | 102015205647 A1 | | 10/2015 | |
| JP | 07000251 A | * | 1/1995 | ............... A47C 7/18 |
| JP | 2011207443 A | ‡ | 10/2011 | |
| KR | 101241018 B1 | ‡ | 3/2013 | |
| KR | 101241018 B1 | | 3/2013 | |
| WO | 09842234 A1 | | 10/1998 | |
| WO | WO-09842243 A1 | ‡ | 10/1998 | |
| WO | 2014105316 A1 | | 7/2014 | |
| WO | WO-2014105316 A1 | ‡ | 7/2014 | ............... B62J 1/26 |
| WO | 2016141501 A1 | | 9/2016 | |
| WO | WO-2016141501 A1 | ‡ | 9/2016 | |

OTHER PUBLICATIONS

Office Action of Chinese Application No. 2017100567025, dated Jan. 18, 2019, 10 pgs.

\* cited by examiner
‡ imported from a related application

SEAT SUPPORT LAYER ASSEMBLY

CROSS-REFERENCE TO RELATED APPLICATIONS

This application is a continuation of 15/404,604 filed on Jan. 12, 2017, which claims foreign priority benefits under 35 U.S.C. § 119(a)-(d) to DE 10 2016 209 218.9, filed May 27, 2016, and DE 10 2016 212 387.4, filed Jul. 7, 2016, the disclosures of which are hereby incorporated by reference in their entirety.

TECHNICAL FIELD

Various embodiments relate to a vehicle seat assembly having a support layer.

BACKGROUND

A seat assembly having a support layer is illustrated and described in U.S. Pat. No. 8,282,164 which issued on Oct. 9, 2012 to Lear Corporation.

SUMMARY

In one embodiment, a seat back assembly is provided. The seat back includes a foam cushion layer and a support sub-assembly. The support sub-assembly includes a rigid support layer having a plurality of cavities and channels defined on a rear surface for receiving components and a generally smooth front surface. At least one component is retained in one of the cavities. A second component is secured on the front surface. A trim material covers the cushion layer and secures the sub-assembly to the seat back.

In another embodiment, the rigid support layer is formed of expanded polypropylene (EPP) material.

In another embodiment, an air pump and a controller are mounted in the cavities along the rear surface and an air bladder is secured to the front surface. The air pump, controller and air bladder provide a lumbar support system in the seat back.

In another embodiment, the air pump and controller are retained on the support layer without any fasteners.

In another embodiment, the air pump and controller are retained in the cavity with an interference fit.

In another embodiment, the sub-assembly includes a wiring harness retained in a channel defined along the rear surface.

In another embodiment, the sub-assembly is retained in the seat back without any fasteners attached to the support layer.

In one further embodiment, a vehicle seat assembly is provided. The seat assembly includes a seat back configured for attachment to a vehicle and having a foam cushion layer defining a seating surface. A rigid expanded polymer layer is disposed adjacent the foam layer. The expanded polymer layer defines at least one cavity on a rear surface and a front surface that abuts the cushion layer. A lumbar support system includes an air pump retained in the at least one cavity along the rear surface of the expanded polymer layer and at least one air bladder mounted to the front surface expanded polymer layer. A trim material covers the cushion layer and secures the rigid expanded polymer layer to the seat back.

In another embodiment, at least one air tube routed from the rear surface to the front surface via at least one of a side cut-out and a through hole defined in the support layer.

In another embodiment, the support layer is retained in the seat back without any fasteners attached to the support layer.

In one other embodiment, a method of manufacturing a seat back is provided. The method includes providing a rigid support layer having a plurality of cavities defined on a rear surface. A sub-assembly is formed by mounting at least one component on the rear surface so the component is retained in one of the cavities without any fasteners. A cushion layer is positioned on the sub-assembly so that that the cushion layer covers at least the front surface of the support layer. A trim material is secured over the cushion layer such that the sub-assembly is retained in the seat back without any fasteners attached to the support layer.

In another embodiment, the method includes mounting a lumbar support system on the support layer. An air pump and a controller are mounted in the cavities along the rear surface and an air bladder is secured to the front surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
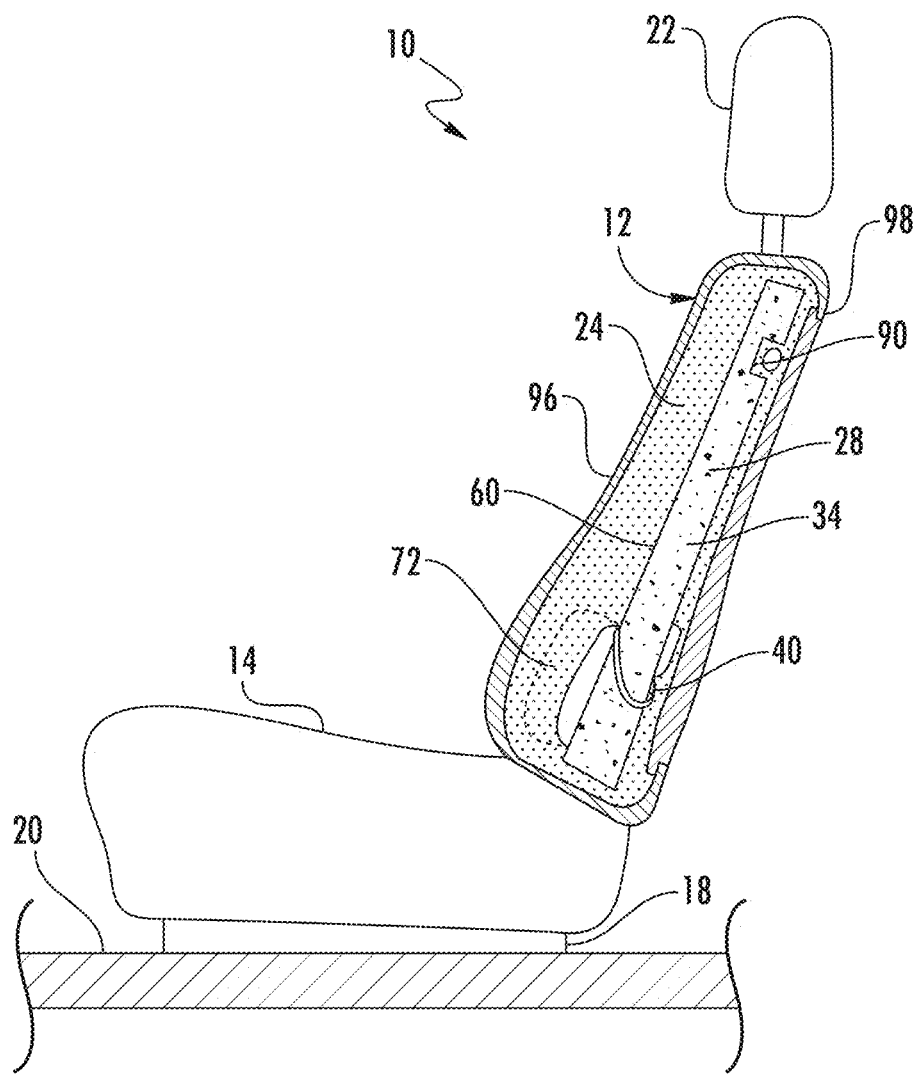
FIG. 1 is a schematic section view of a vehicle seat assembly having a support layer that forms a support sub-assembly.

FIG. 1 illustrates a schematic view of a vehicle seat assembly 10. The vehicle seat assembly 10 may be adapted for use in an automobile vehicle or may be used in with other seat assemblies including in aircraft, theater seats or any suitable seat assemblies.

The seat assembly 10 includes a seat back 12 pivotally mounted and a seat bottom 14. The seat bottom 14 is mounted on a seat frame 18 which is secured to the floor 20, such as the vehicle floor. In some embodiments, the seat back 12 may include a head restraint 22

The seat back 12 and includes a cushion layer 24. The cushion layer 24 may be made of any suitable comfort foam material, such as a suitable resilient polymer. For example, the cushion layer may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, and latex foams. The cushion layer 24 is formed of any suitable comfort material that provides soft resilience as the seat assembly is deflected during use when an occupant is in a seated position.

The seat back 12 also includes a support layer 28 disposed rearward of the cushion layer 24. The support layer 28 is more rigid than the cushion layer 24, and has a hardness greater than the cushion layer 24 in order to provide structural support for the seat back 12.

The support layer 28 is formed of a structural foam material such as an expanded polymer including expanded polypropylene (EPP). In another embodiment, the support layer 28 may be formed of other expanded polyolefins, expanded polystyrenes, expanded polyethylene, expanded polybutylene or other suitable expandable polymers known to a person of ordinary skill in the art. The expanded polymer such as EPP may be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used.

While the structural layer 28 can have any suitable size and configuration the structural foam material that has a rigidity, density and/or hardness that is greater than conventional polyurethane foam used in the cushion layer 24. The structural layer 28 may be formed of Vestocell® brand EPP foam having low density and high strength and elasticity. In at least one embodiment, the structural layer 28 has a density of at least 30 grams per liter (g/L) and less than 180 g/L. In at least one embodiment, the structural layer 28 has a type-C hardness between 35 and 95. In another embodiment, the structure layer foam has a density between 30 g/L and 60 g/L. In one other embodiment, the structural layer foam has a tension between 150 kPa and 370 kPa at 25% compression. In at least one further embodiment, the structural foam has a density of 40 g/L and a tension between 210 kPa and 230 kPa at 25% compression embodiment.

Figure 2:
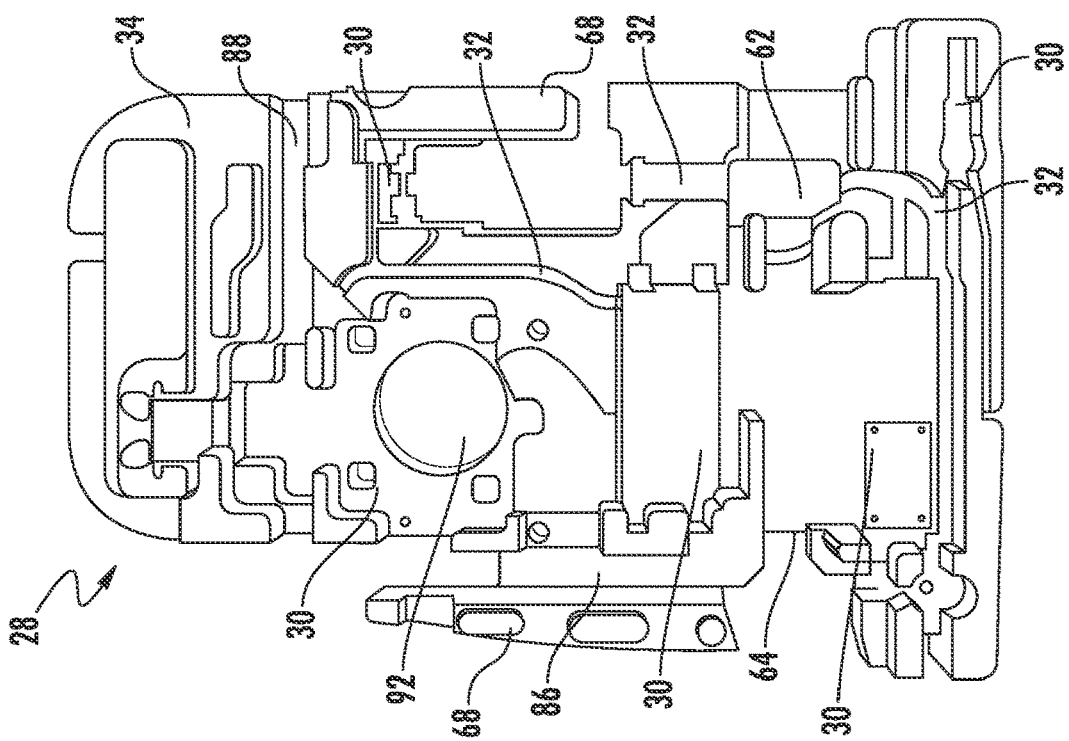
FIG. 2 is a rear perspective view of the support layer shown in FIG. 1.

As illustrated in FIG. 1, the support layer 28 provides structural support for the seat back 12 and may replace a seat back frame that would typically support cushion layer 24 and components mounted in the seat back, as further illustrated in FIGS. 2-5. As shown in FIG. 2, the support layer 28 includes a plurality of cavities 30 and channels 32 formed in a rear surface 34 of the support layer 28. Each cavity 30 is formed with a shape to receive a component required within the seat back 12.

Figure 3:
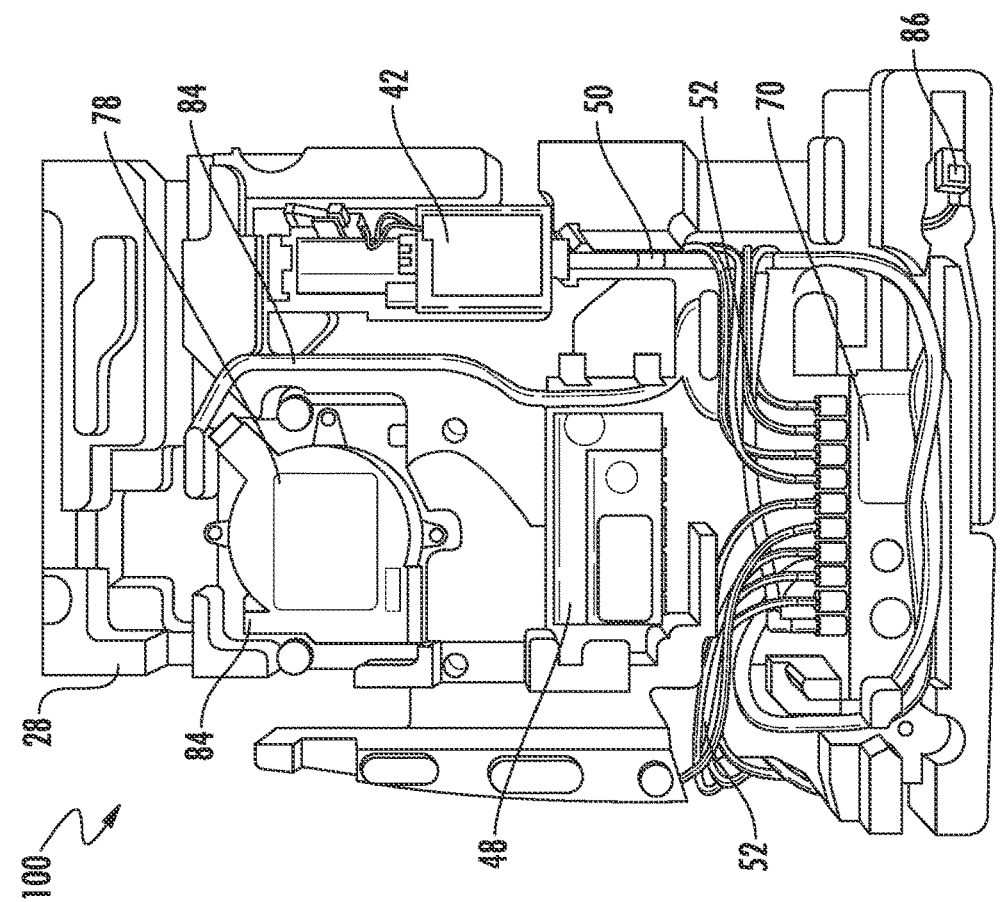
FIG. 3 is a rear perspective view of the support layer in FIG. 2 including assembled components that forms the sub-assembly.

As shown in FIG. 3, numerous components can be mounted to the rear surface 34 of the support layer 28. For example, the components for a lumbar support system 40 are mounted to the support layer 28. The lumbar support system 40 includes an air pump 42 that is connected to a plurality of air bladders 44 and an air valve controller 48.

The air pump 42 is mounted in a cavity 30 and held in the cavity without the need for additional fixtures or fasteners. The properties of the expanded polymer used in support layer 28 allow the walls of the cavities to flex or deform as the electrical component is pressed into position. The cavities 30 may be molded such that the walls forming cavities 30 have a negative draft angle or the cavity 30 may be dimensioned such that when the component is positioned within the cavity, there is an interference fit, such as a press fit between the component and the walls of the cavity 30.

Alternatively, the walls of the cavity may define projections extending inwardly into the cavity to define a snap-fit.

An air supply tube 50 extends from the air pump 42 to the air valve controller 48 along one of the channels 32 formed in the rear surface 34 of the support layer 28. A plurality of air tubes 52 extend from the controller 48 to the bladders 44 that are mounted on a front surface 60 of the support layer 28. The bladder air tubes 52 are routed from the rear surface 34 to a front surface 60 via a through-hole 62 and a cut-out 64 formed in the support layer 28. The through-hole 62 extends a from the rear surface 34 to the front surface 60. The cut-out 64 forms an indentation on a side surface 68 of the support layer 28.

The lumbar support system 40 may also include a massage control module 70 that controls air valve actuation to provide varying pressures to the air bladders 44 in a predetermined pattern. The lumber support controller 48 and the massage air valve controller 70 are both mounted with a press-fit in cavities 30 along the rear surface 34 of the support layer 28.

Figure 5:
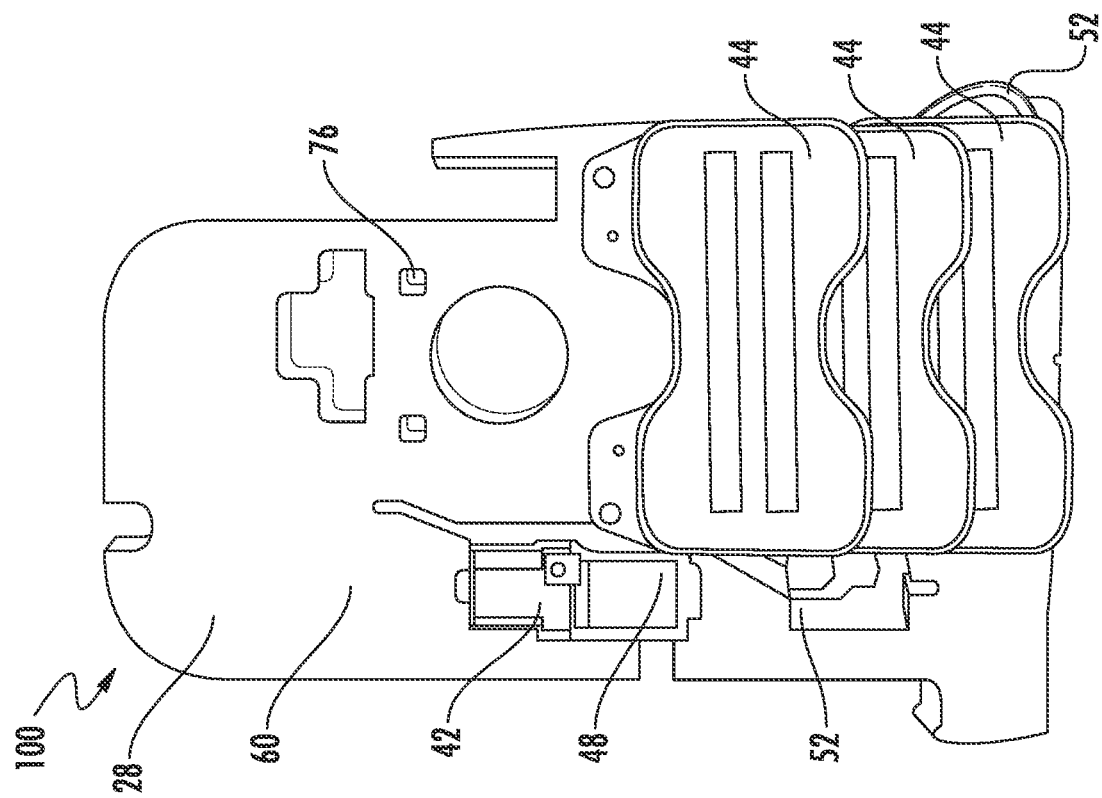
FIG. 5 is a front perspective view of the support layer in FIG. 4 including assembled components that forms the sub-assembly.
Figure 4:
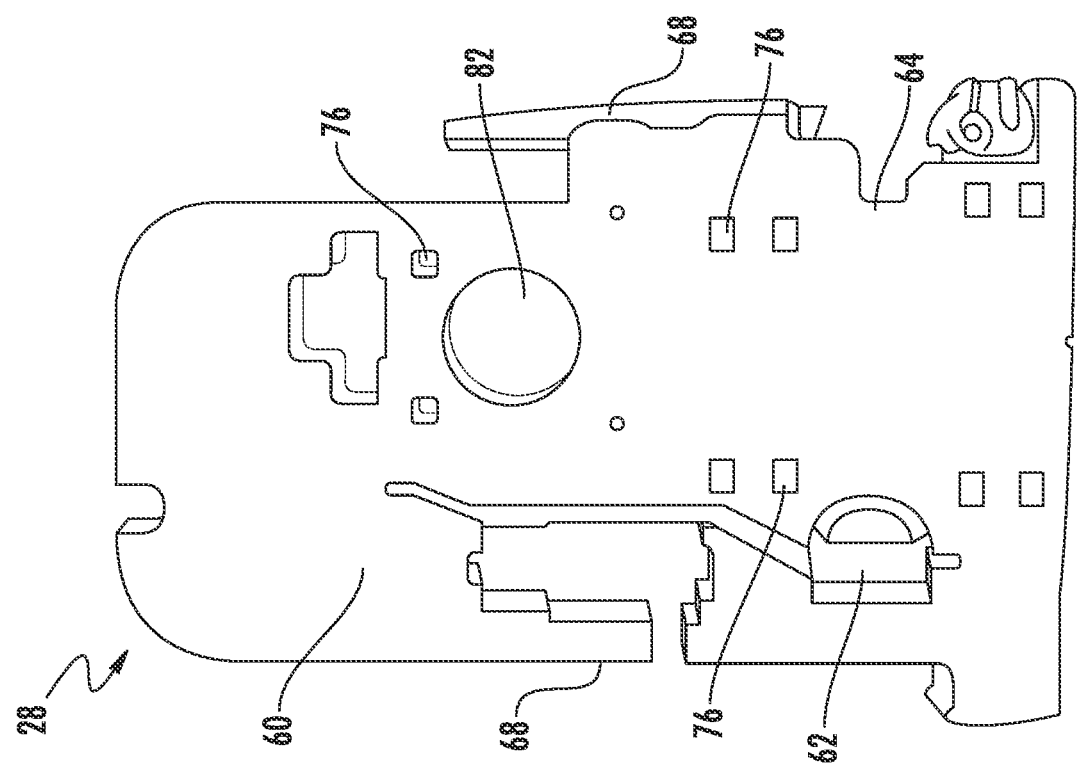
FIG. 4 is a front perspective view of the support layer shown in FIG. 2.

As shown in FIG. 4, the front surface 60 of the support layer 28 is generally planar and provides a smooth comfort surface to the seated occupant. However, the front surface 60 may also have a contour. The lumbar support system 40 includes a plurality of air bladders 44 mounted along the front surface 60 of the support layer 28. As shown in FIG. 5, the air bladders 44 are arranged in a vertical array in along a lower lumbar region 72 of the seat. However, the air bladders 44 may be arranged in any suitable pattern or location along the front surface of support layer.

The air bladders 44 are mounted onto a felt-carrier 46. The felt-carrier 46 with the air bladders 44 is then mounted to mounting apertures 76 formed along the front surface 60 of the support layer 28. The felt-carrier 46 may be mounted to the mounting apertures 76 with a push-pin or fir-tree clip, for example. The mounting apertures 76 extend from the front surface 60 through to the rear surface 34 and are generally small being 5 mm to 20 mm, for example. In another embodiment, the air bladders 44 may be attached directly to the front surface with fasteners or protrusions formed on the air bladder 44 that may be press-fit into mounting apertures.

As shown in the front view of the support layer in FIG. 5, the air pump 42 is mounted to a cavity 30 that extends through the support layer 28. However, the air pump 42 does not extend beyond the generally smooth front surface 60 so that a protrusion is not felt through the cushion layer 24 by a seated occupant.

A fan 78 may also be mounted in a cavity 30 formed along the rear surface 34 of the support layer 28. The cavity 30 may include a through-opening 82 that extends from the rear surface 34 to the front surface 60 so in order provide air circulation to a front surface 60 of the support layer and provide cooling to the seated occupant. The fan 78 may be mounted to the support layer 28 using a bracket 80 that mates with the cavity 30. The bracket 80 may be secured to the support layer with protrusions or fir-tree clips that cooperate with mounting apertures 76.

A wire harness 84 is connected to the fan 78 and the controllers 48, 70 and the air pump 42. The wire harness 84 is routed along a channel 32 along the rear surface 34 of the support layer 28. The wire harness 84 may also include the wiring for seat heating components. The wire harness 84 may be connected at an electrical connector 86. The electrical connector 86 may also be secured to the support layer 28 at a molded cavity 30.

The rear surface 34 also has trench 88 that extends laterally across the support layer 28. The trench 88 receives a lateral post 90 (FIG. 1) that forms part of the seat back frame 18. Cooperation of the lateral post 90 with the trench 88 allows the support layer 28 to be aligned and positioned correctly. A vertical trench 92 may also be formed on the rear surface 34 and may also receive a vertical post of the frame 18 in order to further position the support layer 28. The lateral post 90 may connect a pair of vertical posts along the frame 18 of the seat back 12. The rear surface 34 may have any configuration of trenches that form the negative space of the seat frame.

The support layer 28 is not secured by any fasteners. Instead, the support layer 28 is secured in place by the trim material 96 that surrounds the cushion layer 24. Since the cushion layer 24 and covers the support layer 28, the trim material 96 acts to constrain the cushion layer 24 and thereby the support layer 28. In one embodiment, the trim material 96 may include a backboard 98 that covers the rear surface 34 of the support layer 28. In another embodiment, the trim material 96 may cover the rear surface 34 of the support layer 28. In one other embodiment, the rigid backboard 98 may be formed as part of the frame 18.

The support layer 28 may help reduce noise, vibration, and harshness that is associated with the operation of the components such as the air pump, for example. The support layer 28 also reduces the weight of the seat 10 while still providing structural support. In addition, the continuous support layer 28 provides force distribution from the seat structure to the seated occupant.

Figure 6:
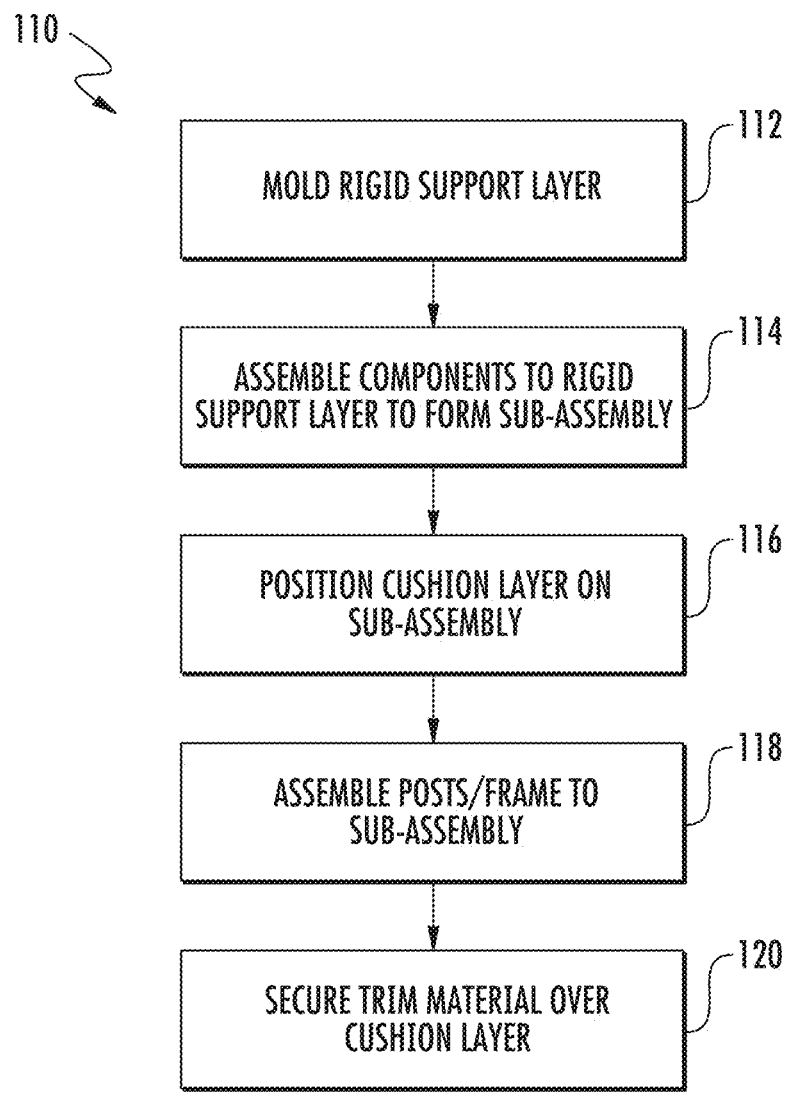
FIG. 6 is a flow chart illustrating a method of assembling the vehicle seat of FIG. 1.

The support layer 28 that allows easy mounting of components also streamlines the manufacturing process of the seat back 12. FIG. 6 illustrates a method of manufacturing a seat back 12 that utilities the support layer 28 to form a complete sub-assembly 100.

As shown in FIG. 6, a method 110 of assembling a seat back is provided. First, the rigid support layer 28 is molded at step 112. The support layer 28 is molded with predefined cavities, channels, trenches, cut-outs, through-holes, along the rear surface, as shown in FIG. 2 and described in detail above. The support layer 28 may be formed of expanded polymer such as EPP may be molded in a mold cavity by a bead polymerization process to form a rigid support. For example, foam beads may be injected into a mold tool and superheated with steam and sintered together. After cooling and stabilizing the formed and molded parts can be removed from the mold tool. However, any suitable mold process known to a person of ordinary skill in the art may be utilized to form the rigid support.

In step 114, the components are assembled to the support layer 28 to form the sub-assembly 100. The sub-assembly 100 includes all of the components for the lumbar support system 40, as discussed above. The sub-assembly 100 may also include other seat back components such as the fan and wire-harness, shown in FIG. 3 and FIG. 5. However any components required to be provided in the seat back may be mounted on the support layer 28 to form the sub-assembly 100.

The cushion layer 24 is positioned on the sub-assembly 100 in step 116. The cushion layer 24 is positioned to cover the front surface 60, including the lumbar assembly 40. The cushion layer 24 may also cover the side surfaces 68 and a top surface of the support layer 28. The cushion layer 24 may have cavities formed or molded on the B-surface to receive the sub-assembly 100 and align the cushion layer 24 with the sub-assembly 100. In one embodiment, the cushion layer 24 may include an air connector to be mounted to the fan 78. The air connector may be passed through hole 92 and then attached to the fan 78. The fan 78 may be mounted to the support layer 28 after the cushion layer 24 is pre-assembled to the sub-assembly 100. The air connector mounted on the cushion layer 24 also helps align and position the cushion layer 24 with the sub-assembly 100.

In step 118, the sub-assembly 100 and cushion layer 24 are assembled to the lateral post 90 and vertical post. The lateral and vertical posts may be part of the seat back frame 18. The frame 18 is assembled to the sub-assembly 100 in the lateral trench 86 and vertical trench 88.

In step 120, the trim material 96 is secured over the cushion layer 24. In one embodiment, the trim material 96 secures the sub-assembly 100 in the seat back without any fasteners being connected to the support layer 28. The trim material 96 may be secured to the cushion layer 24 or the back board 98 with clips of any other suitable securement device. In another embodiment, the trim material 96 is attached to the cushion layer 24 by hog rings, clips, fasteners or any other trim attachment known to a person of ordinary skill in the art. The trim material 96 is then wrapped around the sub-assembly 100 and attached to a trim trench formed on the frame 18 or on the backboard 98. The trim material 96 may be attached to the frame or the backboard 98 by any suitable method or trim attachment. The seat back wire harness 84 is connected to a main wiring harness via the electrical clip 86 in order to supply power to the components in the seat back, such as the pump While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat back assembly comprising:
   a seat back adapted to be mounted to a seat bottom, the seat back comprising:
   a foam cushion layer;
   a support sub-assembly comprising:
      a rigid support layer formed of structural foam, providing structural support for the seat back assembly; and
      at least one component retained on the rigid support layer,
   wherein the support sub-assembly is retained in the seat back assembly without any fasteners attached to the rigid support layer.

2. The seat back assembly of claim 1, wherein the rigid support layer is formed of expanded polypropylene (EPP) material.

3. The seat back assembly of claim 1, wherein the at least one component is retained on the rigid support layer without any fasteners.

4. The seat back assembly of claim 1, wherein the rigid support layer has a plurality of cavities defined on a rear surface, wherein the at least one component is retained in at least one of the cavities.

5. The seat back assembly of claim 4, wherein the at least one component is retained in at least one of the plurality of cavities with an interference fit.

6. The seat back assembly of claim 4 wherein a second component is secured to an aperture on a front surface.

7. The seat back assembly of claim 6, wherein the at least one component comprises an air pump and a controller being mounted in the cavities along the rear surface and the second component comprises an air bladder secured to the front surface, the air pump, controller and air bladder providing a lumbar support system in the seat back assembly.

8. The seat back assembly of claim 1, further comprising a trim material covering the foam cushion layer and securing the support sub-assembly.

9. A vehicle seat assembly comprising:
- a seat back configured for attachment to a vehicle and having a foam cushion layer defining a seating surface;
- a rigid expanded polymer layer disposed adjacent the foam cushion layer and providing structural support for the seat back;
- an inflatable support system retained on the rigid expanded polymer layer, wherein the inflatable support system comprises:
  - an air pump retained in at least one cavity defined along a rear surface of the rigid expanded polymer layer with an interference fit; and
  - at least one air bladder mounted to a front surface of the rigid expanded polymer layer; and
- a trim material covering the foam cushion layer and securing the rigid expanded polymer layer to the seat back,
- wherein the rigid expanded polymer layer is retained in the seat back without any fasteners attached to the rigid expanded polymer layer.

10. The vehicle seat assembly of claim 9, further comprising at least one air tube routed from the rear surface to the front surface via at least one of a side cut-out and a through hole defined in the rigid expanded polymer layer.

11. The vehicle seat assembly of claim 9, further comprising a second component retained in a second cavity defined on the rear surface.

12. The vehicle seat assembly of claim 11, further comprising a wiring harness retained in a channel defined along the rear surface along and connecting the air pump and the second component.

13. A method of manufacturing a seat back:
- molding a rigid support layer of structural foam for providing structural support for a seat back;
- forming a sub-assembly by retaining at least one component on the rigid support layer without any fasteners;
- positioning a cushion layer on the sub-assembly so that that the cushion layer covers at least a front surface of the rigid support layer;
- securing a trim material over the cushion layer such that the sub-assembly is retained in the seat back without any fasteners attached to the rigid support layer.

14. The method of claim 13, wherein the rigid support layer is molded to define a plurality of cavities defined on a rear surface.

15. The method of claim 13, further comprising molding the rigid support layer of an expanded polypropylene (EPP) material.

16. The method of claim 14, further comprising retaining the at least one component in one of the plurality of cavities with an interference fit.

17. The method of claim 16, further comprising retaining the at least one component in one plurality of cavities with a press-fit.

18. The method of claim 14, further comprising mounting a lumbar support system on the rigid support layer, wherein an air pump and a controller are mounted in the cavities along the rear surface and an air bladder is secured to the front surface.

* * * * *